US012755532B2

(12) United States Patent
Xiao et al.

(10) Patent No.: US 12,755,532 B2
(45) Date of Patent: Oct. 6, 2026

(54) DEEP VIDEO UNDERSTANDING WITH LARGE LANGUAGE MODELS

(71) Applicant: Roku, Inc., San Jose, CA (US)

(72) Inventors: Fei Xiao, San Jose, CA (US); Abhishek Bambha, Burlingame, CA (US); Rohit Mahto, San Jose, CA (US); Nam Vo, San Jose, CA (US); Ronica Jethwa, Mountain View, CA (US); Atishay Jain, San Jose, CA (US); Jose Sanchez, San Jose, CA (US); Lian Liu, San Jose, CA (US); Pulkit Aggarwal, San Jose, CA (US); Amit Verma, Sunnyvale, CA (US); Zidong Wang, San Jose, CA (US)

(73) Assignee: Roku, Inc., San Jose, CA (US)

( * ) Notice: Subject to any disclaimer, the term of this patent is extended or adjusted under 35 U.S.C. 154(b) by 294 days.

(21) Appl. No.: 18/392,340

(22) Filed: Dec. 21, 2023

(65) Prior Publication Data

US 2025/0209815 A1 Jun. 26, 2025

(51) Int. Cl.
*G06V 20/40* (2022.01)
*G06V 10/82* (2022.01)
*G06F 40/58* (2020.01)

(52) U.S. Cl.
CPC .............. *G06V 20/41* (2022.01); *G06V 10/82* (2022.01); *G06V 20/46* (2022.01); *G06F 40/58* (2020.01)

(58) Field of Classification Search
None
See application file for complete search history.

(56) References Cited

U.S. PATENT DOCUMENTS

| | | | | |
|---|---|---|---|---|
| 10,999,566 | B1 * | 5/2021 | Mahyar | G06F 16/738 |
| 2021/0012222 | A1 * | 1/2021 | Kim | G06F 40/30 |
| 2021/0117623 | A1 * | 4/2021 | Aly | G06N 3/044 |
| 2022/0264178 | A1 * | 8/2022 | Garg | G06V 20/41 |
| 2022/0374637 | A1 * | 11/2022 | Liu | G06V 20/46 |
| 2023/0153836 | A1 * | 5/2023 | Smith | G06Q 30/0261 |
| 2025/0190503 | A1 * | 6/2025 | Lee | G06F 16/783 |
| 2025/0193462 | A1 * | 6/2025 | Govindarajan | G06F 16/90335 |

* cited by examiner

*Primary Examiner* — Oneal R Mistry
(74) *Attorney, Agent, or Firm* — STERNE, KESSLER, GOLDSTEIN & FOX P.L.L.C.

(57) ABSTRACT

Disclosed herein are system, apparatus, article of manufacture, method and/or computer program product embodiments, and/or combinations and sub-combinations thereof, for deep video understanding with large language models. An example embodiment operates by determining a relationship between respective first and second visual elements for each of a plurality of frames of a content item based on respective element types and respective locations for the respective first and second visual elements. For each of the plurality of frames, a respective visual prompt is generated describing the relationship between the respective first and second visual elements. Based on an audio-to-text conversion of audio content associated with the frame or classification of aural elements of the audio content, a respective audio prompt describing the audio content associated with each frame is generated. A description of the content item is output by a large language model (LLM) based on the visual prompts and audio prompts for the plurality of frames input to the LLM.

20 Claims, 4 Drawing Sheets

DEEP VIDEO UNDERSTANDING WITH LARGE LANGUAGE MODELS

FIELD

This disclosure is generally directed to content item analysis, and more particularly to deep video understanding via large language models (LLMs).

SUMMARY

Provided herein are system, apparatus, article of manufacture, method and/or computer program product embodiments, and/or combinations and sub-combinations thereof, for deep video understanding with large language models. For each frame of a plurality of frames of a content item, a relationship between a respective first visual element and a respective second visual element within the frame may be determined based on respective element types and respective locations for the respective first visual element and the respective second visual element within the frame. For each frame of the plurality of frames of the content item, a respective visual prompt may be generated comprising a textual description of the relationship between a respective first visual element and a respective second visual element within the frame. Based on an audio-to-text conversion of audio content associated with the frame or classification of aural elements of the audio content, a respective audio prompt comprising a textual description of the audio content associated with the frame may be generated. A description of the content item may be received based on the respective visual prompt and the respective audio prompt for each frame of the plurality of frames input to a large language model (LLM) trained to output descriptive information for content items.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
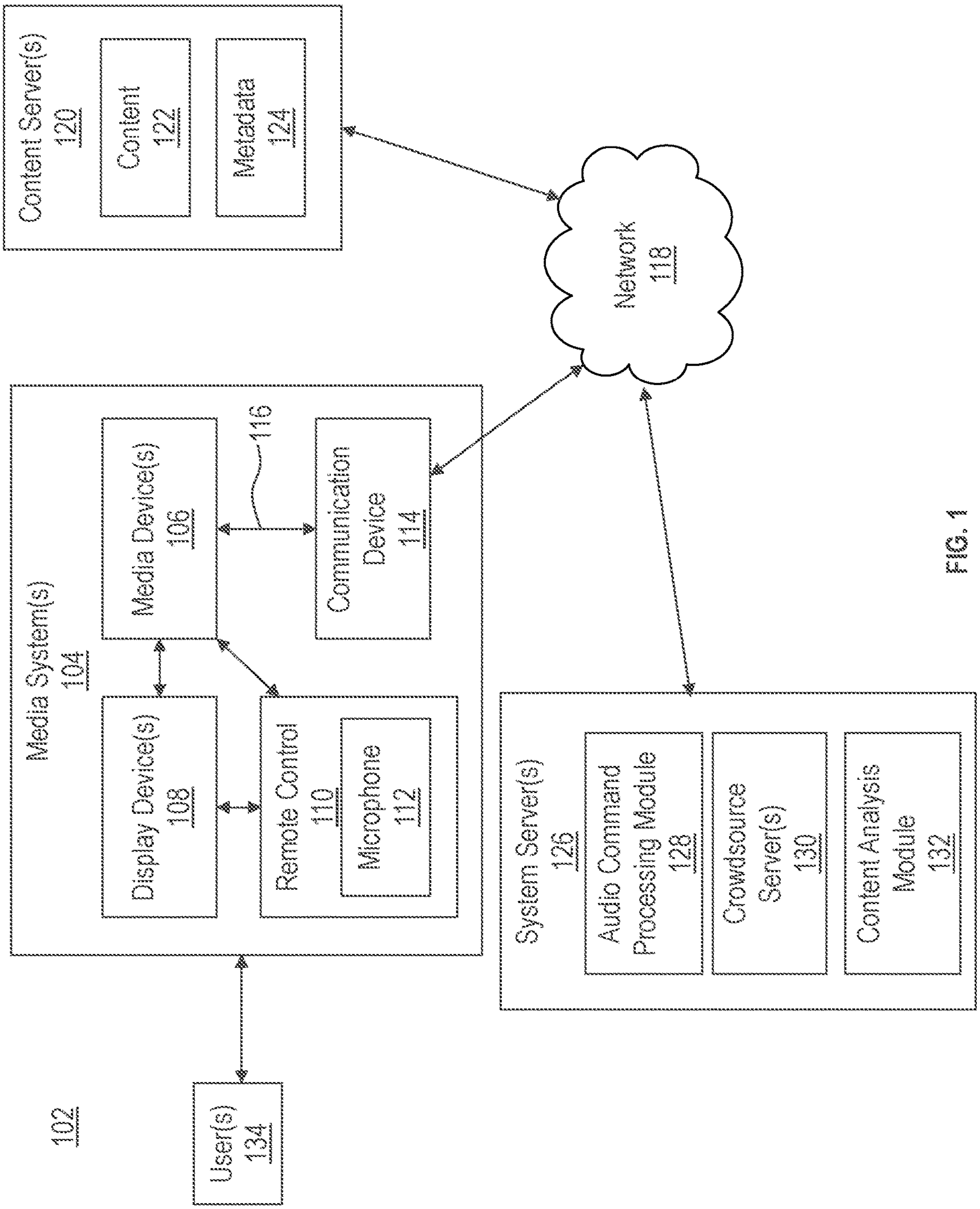
FIG. 1 illustrates a block diagram of a multimedia environment, according to some embodiments.

Provided herein are system, apparatus, device, method, computer program product embodiments, and/or combinations and sub-combinations thereof, for deep video understanding with large language models. Content analysis techniques such as image classification, metadata extraction, and/or the like may be used to understand the context (e.g., topic, storyline, summary, etc.) of content items. An understanding of the context of content items may be used for tasks including, but limited to, identifying content items that match a query, providing recommendations for content items, and/or the like. Conventional content item analysis techniques often struggle with providing accurate and detailed descriptions of visual elements/objects, audio components, and their interrelations within content items. As described herein, the use of large language models enables a deep understanding of content items while reducing or eliminating computational resources, coding, and complex systems required to implement other machine learning and artificial intelligence techniques. Deep video understanding with large language models enables a content delivery system to effectively recognize and describe the context of content items in a format that is both accessible and useful for users, devices, and/or applications. These and other technological advantages are described herein.

As used in the specification and the appended claims, "content items" may also be referred to as "content," "content data," "content information," "content asset," "multimedia asset data file," or simply "data" or "information". Content items may be any information or data that may be licensed to one or more individuals (or other entities, such as businesses or groups). Content may be electronic representations of video, audio, text, graphics, or the like which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether the format is presently known or developed in the future. The content items described herein may be electronic representations of music, spoken words, or other audio, which may be but is not limited to data files adhering to the MPEG1 Audio Layer 3 (.MP3) format, Adobe®, CableLabs 1.0,1.1, 3.0, AVC, HEVC, H.264, Nielsen watermarks, V-chip data and Secondary Audio Programs (SAP), Sound Document (.ASND) format, or some other format configured to store electronic audio whether the format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether the format is presently known or developed in the future. Content items may be any combination of the above-described formats.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure applies to any type of media (instead of or in addition to streaming media), as well as any mechanism, means, protocol, method, and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 134 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smartphone, tablet, wearable (such as a watch or glasses), appliance, Internet of Things (IoT) device, and/or projector, to name just a few examples. In some embodiments, media device 106 can be a part of, integrated with, operatively coupled to, and/or connected to its respective display device 108.

Figure 2:
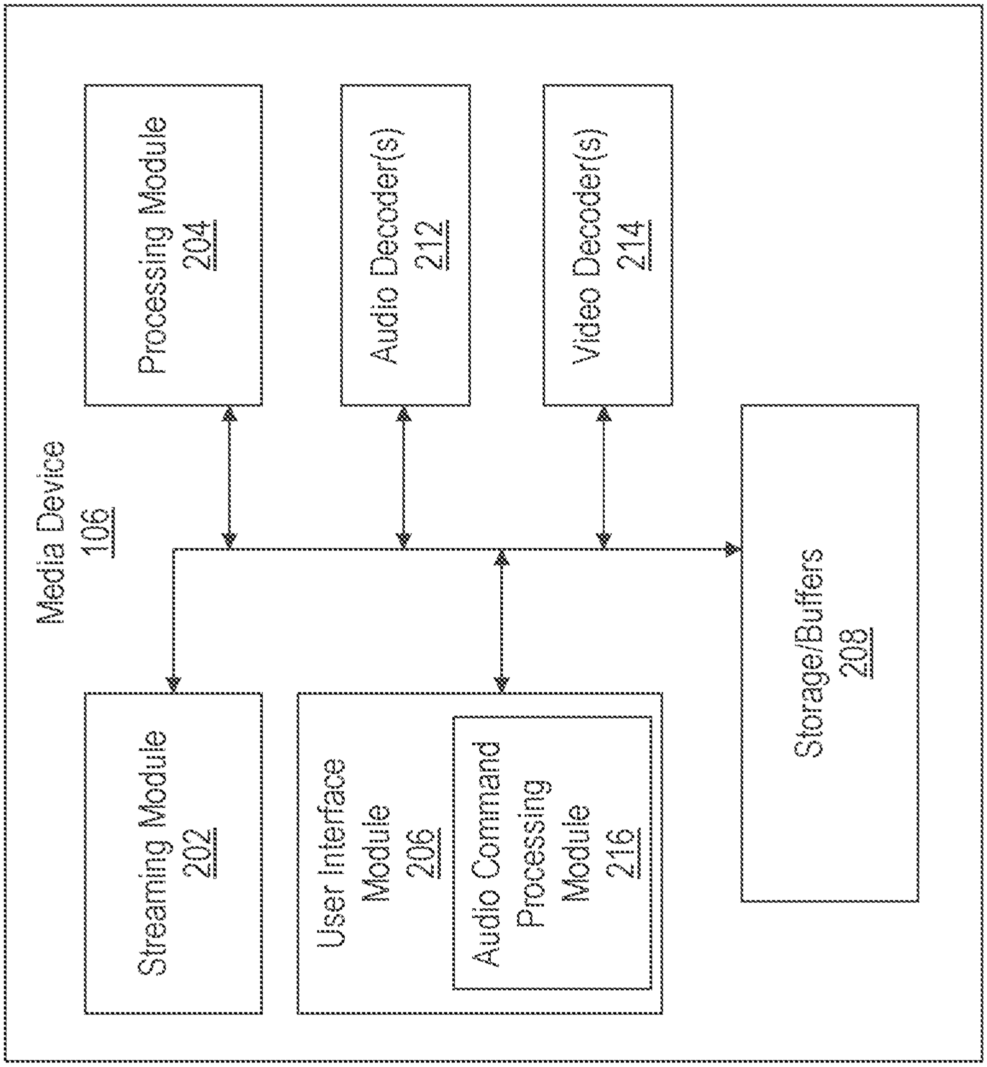
FIG. 2 illustrates a block diagram of a streaming media device, according to some embodiments.

FIG. 2 illustrates a block diagram of an example media device 106, according to some embodiments. Media device 106 may include a streaming module 202, processing module 204, storage/buffers 208, and user interface module 206. The user interface module 206 may include an audio command processing module 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Returning to FIG. 1, each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

According to some aspects of this disclosure, network 118 can include, without limitation, wired and/or wireless intranet, extranet, Internet, cellular, Bluetooth, infrared, and/or any other short-range, long-range, local, regional, global communications mechanism, means, approach, protocol and/or network, as well as any combination(s) thereof.

Media system 104 may include a remote control 110. The remote control 110 can be any component, part, apparatus, and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels, or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of content items, music, videos, movies, TV programs, multimedia, images, still pictures, text, graphics, gaming applications, advertisements, programming content, public service content, government content, local community content, software, and/or any other content and/or data objects in electronic form.

According to some aspects of this disclosure, metadata 124 comprises data about content 122. For example, metadata 124 may include associated or ancillary information indicating or related to writer, director, producer, composer, artist, actor, summary, chapters, production, history, year, trailers, alternate versions, related content, applications, objects depicted in content and/or content items, object types, closed captioning data/information, audio description data/information, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system server(s) 126. The system server(s) 126 may operate to support the media devices 106 from the cloud. It is noted that the structural and functional aspects of the system server(s) 126 may wholly or partially exist in the same or different ones of the system server(s) 126.

The system server(s) 126 may include an audio command processing module 128. As noted above, the remote control 110 may include a microphone 112. The microphone 112 may receive audio data from users 134 (as well as other sources, such as the display device 108). In some embodiments, the media device 106 may be audio responsive, and the audio data may represent verbal commands from the user 134 to control the media device 106 as well as other components in the media system 104, such as the display device 108.

According to some aspects of this disclosure, the audio data received by the microphone 112 in the remote control 110 is transferred to the media device 106, which is then forwarded to the audio command processing module 128 in the system server(s) 126. The audio command processing module 128 may operate to process and analyze the received audio data to recognize the user 134's verbal command. The audio command processing module 128 may then forward the verbal command back to the media device 106 for processing.

According to some aspects of this disclosure, the audio data may be alternatively or additionally processed and analyzed by an audio command processing module 216 in the media device 106 (see FIG. 2). The media device 106 and the system server(s) 126 may then cooperate to pick one of the verbal commands to process (either the verbal command recognized by the audio command processing module 128 in the system server(s) 126, or the verbal command recognized by the audio command processing module 216 in the media device 106).

Now referring to both FIGS. 1 and 2, according to some aspects of this disclosure, the user 134 may interact with the media device 106 via, for example, the remote control 110. For example, the user 134 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 134.

In streaming embodiments, the streaming module 202 may transmit the content to the display device 108 in real-time or near real-time as it receives such content from the content server(s) 120. In non-streaming embodiments, the media device 106 may store the content received from content server(s) 120 in storage/buffers 208 for later playback on display device 108.

According to some aspects of this disclosure, the media devices 106 may exist in thousands or millions of media systems 104. Accordingly, the media devices 106 may lend themselves to crowdsourcing embodiments and, thus, the system server(s) 126 may include one or more crowdsource server(s) 130.

According to some aspects of this disclosure, using information received from the media devices 106 in the thousands and millions of media systems 104, the crowdsource server(s) 130 may identify similarities and overlaps between closed captioning requests issued by different users 134 watching a particular movie. Based on such information, the crowdsource server(s) 130 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 130 may operate to cause closed captioning to be automatically turned on and/or off during future streamings of the movie.

According to some aspects of this disclosure, the system server(s) 126 may include a content analysis module 132. The content analysis module 132 may include one or more machine learning models (e.g., deep learning models, predictive models, neural networks, large language models (LLMs), etc.) inter-operating to analyze content items, detect visual elements/objects, identify relationships between the visual elements/objects, identify contextual relationships between audio content and the visual elements/objects, to output a detailed description of the content item. The detailed description may detail the topic, storyline, context, summary, synopsis, and/or the like of the content item. For example, content analysis module 132 may use frame-based visual elements/object data and audio data associated with a content item as input to an LLM, and the LLM may output information indicative of what is happening in the content item. The LLM may be a knowledge base trained on a large corpus of relative data (e.g., Internet data, etc.) to facilitate outputting information indicative of what is happening in content items. The trained LLM may be fine-tuned for deep video understanding (e.g., to provide optimized outputs, etc.) using methods including, but not limited to, expected data output feedback, reinforcement learning from human feedback (RLHF), and/or the like.

Deep Video Understanding with Large Language Models

Content analysis techniques such as image classification, metadata extraction, and/or the like may be used to understand the context (e.g., topic, storyline, summary, etc.) of content items. An understanding of the context of content items may be used for tasks including, but limited to, identifying content items that match a query, providing recommendations for content items, and/or the like. Conventional content item analysis techniques often struggle with providing accurate and detailed descriptions of visual elements/objects, audio components, and their interrelations within content items. The content analysis module 132 facilitates improved content item analysis over conventional systems by implementing a deep learning model that leverages an LLM to analyze video frames. The use of an LLM to analyze video frames reduces or eliminates computational resources, coding, and complex systems required to implement other machine learning and artificial intelligence techniques. Deep video understanding with large language models enables content analysis module 132 to effectively recognize and describe the context of content items in a format that is both accessible and useful for users, devices, and/or applications. These and other technological advantages are described herein.

According to some aspects of this disclosure, the content analysis module 132 may generate a descriptive prompt for each frame of a content item. The descriptive prompts may be time-sequenced and input to an LLM. As described herein, the LLM serves as a knowledge base trained on a large corpus of relative data (e.g., Internet data, etc.). The LLM may output a natural language description (e.g., a synopsis, a storyline, a summary, a contextual description, etc.) of the content item. Output from the LLM may be used to enhance searchability, accessibility, and interaction with the content item.

According to some aspects of this disclosure, an LLM(s) of the content analysis module 132 may be constructed from multiple neural network layers including, but not limited to, recurrent layers, feedforward layers, embedding layers, attention layers, and/or the like that operate in tandem to process input text (e.g., visual prompts and audio prompts derived from content items, etc.) and generate an output (e.g., a synopsis, a storyline, a summary, a contextual description, etc.) of the content item. An embedding layer of an LLM may generate embeddings from the input text. The embedding layer may be configured to capture the semantic and syntactic meaning of any input text to enable the LLM to understand the context. The feedforward layer may include multiple fully connected layers that transform the input embeddings. Feedforward layers enable the LLM to glean higher-level abstractions (e.g., user intent, etc.) from the input text. The recurrent layer may interpret the words in the input text in sequence to understand their relationship, and the attention layers may use weights that enable the LLM to focus on single parts of the input text that are relevant to the task at hand.

An LLM of the content analysis module 132 may be trained on using large textual datasets (e.g., Internet-derived datasets, etc.) consisting of trillions of words fed to the LLM in an unsupervised manner. During this training, a semantic analysis algorithm may be used to enable the LLM to learn word meanings, relationships between words, word context distinctions, etc. A trained LLM may be fine-tuned for a specific task such as outputting descriptions of content items based on relative prompts. For example, the LLM may be used to describe the context of a content item based on visual prompts and audio prompts. A visual prompt may be a textual and/or symbolic representation and/or description of visual elements/objects depicted within a content item. For example, a visual prompt may include descriptions of visual elements/objects, their locations, and relationships, encoded in a text and/or symbolic format that the LLM can process. An audio prompt may be generated based on audio content (e.g., voices, sounds, soundtracks, etc.) associated with a content item. An audio prompt may be a textual description of audio content associated with a frame, portion, segment, and/or the like of a content item. According to some aspects of this disclosure, a trained LLM may be fine-tuned for deep video understanding (e.g., to provide optimized outputs, etc.) using methods including, but not limited to, expected data output feedback, reinforcement learning from human feedback (RLHF), and/or the like.

According to some aspects of this disclosure, when analyzing a content item, the content analysis module 132 may utilize a deep learning model (e.g., a predictive model, a convolutional neural network, etc.) configured to perform object detection and localization. By iterating through each frame of a content item, identifying objects and their relationships within the frames, and converting the information into prompts for an LLM, textual representations of the visual elements/objects within each frame may be generated, stored, analyzed, and/or displayed. To determine relationships between visual elements/objects depicted in frames of a content item, once visual elements/objects are identified, feature vectors representing attributes of the visual elements/objects may extracted from the content item. According to some aspects of this disclosure, attributes of the visual elements/objects may include, but are not limited to, size, shape, color, and position within a frame.

Extracted features from a content item may be used to classify visual elements/objects within the content item into predefined categories. For example, for a content item that depicts a duck hunting scene, visual elements/objects may be classified as 'person', 'bow', 'goose', 'dog', etc., based on their features. The content analysis module 132 may then perform spatial and temporal relationship analysis. Spatial relationships between visual elements/objects within a single frame may be analyzed, for example, to determine if a visual element/object is to the left of, to the right of, above, below, or near another visual element/object. Temporal relationships across frames of a content item may also be analyzed to understand interactions between visual elements/objects over time (e.g., determining if a visual element/object is moving towards or away from another visual element/object.

According to some aspects of this disclosure, relationships between visual elements/objects might be represented using graphs where nodes represent visual elements/objects and edges represent relationships. The content analysis module 132 may include graph neural networks (GNNs) trained to analyze these relationships between visual elements/objects depicted in content items. For example, machine learning models of the content analysis module 132 may be trained using training data where relationships between visual elements/objects are manually annotated and/or labeled and used to teach the machine learning models to recognize similar relationships in new, unseen data.

The performance of machine learning models of the content analysis module 132 in determining relationships between visual elements/objects may be evaluated using a separate set of annotations and/or labels indicative of relationships. Attention mechanisms can be employed to enable machine learning models of the content analysis module 132 to focus on different parts of content item data (e.g., frames, images, etc.) when determining relationships between visual elements/objects to enable the machine learning models to handle frames/scenes with many visual elements/objects or complex interactions. Based on the evaluation, machine learning models of the content analysis module 132 may be fine-tuned to improve accuracy.

According to some aspects of this disclosure, once visual elements/objects associated with frames of a content item and their interrelationships have been determined, the content analysis module 132 may generate a visual prompt to be input to an LLM. The LLM may process the visual prompt to generate textual analysis, descriptions, or other relevant outputs based on the visual prompt. For example, the LLM of the content analysis module 132 may be used to generate a natural language description of the visual frame/scene of the content item. According to some aspects of this disclosure, the LLM may be used for tasks including, but not limited to, answering questions, generating insights, performing other text-based analyses based on the visual prompt, and/or the like.

According to some aspects of this disclosure, a visual prompt may be input to an LLM of the content analysis module 132 along with an audio prompt. To generate an audio prompt, the content analysis module 132 may convert/transcribe any audio content associated with a content item into text. The converted/transcribed audio content, in text form, may be analyzed to understand the content of the audio content.

Analysis of converted/transcribed audio content may include keyword extraction, audio-to-text conversion of audio content, classification of aural elements (e.g., voices, music, sounds related to actions/objects, etc.) of the audio content, and/or sentiment analysis. For example, content analysis module 132 may extract key terms and phrases that are central to the content of the converted/transcribed audio. Key terms may be input to a predictive model trained for sentiment analysis and/or the like to assess the tone and sentiment of the audio content. Transcribed audio content, information describing results from sentiment analysis, key terms, and/or the like may be used to generate an audio prompt for an LLM of the content analysis module 132. Audio prompts derived from a content item may be time-sequenced and input to an LLM. Audio prompts derived from a content item may be used along with visual prompts to inform the LLM of both visual and aural elements of a content item so that the output of the LLM describing a content item is optimized.

According to some aspects of this disclosure, an algorithm for content analysis module 132 to use a large language model is provided in Algorithm 1 below. According to some aspects, Algorithm 1 is just an example and other algorithms may be used for facilitating deep video understanding with large language models.

Algorithm 1

Steps:
1. Identify a content item.
2. For iterate=1 to N (where N=any number of frames of the content item):

a. Perform object detection (e.g., object recognition and object classification, etc.) to identify visual elements within the frame;
b. Identify a type/name and location of visual elements;
c. Determine relationship(s) between the visual elements based on the types/names and locations;
d. Convert relationship(s) to visual prompt;
e. Perform audio detection to identify and classify aural elements of audio content associated with the frame;
f. Perform audio-to-text conversion of voice components of the audio content associated with the frame;
g. Convert identified/classified aural elements and/or audio-to-text converted components of the audio content associated with the frame to an audio prompt.

3. Sequence visual prompts and audio prompts according to the temporal sequence of the frames of the content item;
4. Input sequenced visual prompts and audio prompts into a pre-trained large language model (LLM)
5. Receive descriptive information for the content item from LLM.
6. Endfor.

Example prompts generated for input to an LLM of content analysis module 132 according to Algorithm 1 are provided below. According to some aspects, Example Prompts are just examples and other prompts may be used for facilitating deep video understanding with large language models.

Example Prompts

VisualPrompt—What is happening in a video where the first frame includes a goose in the sky, a man on the ground with a bow, and a dog nearby; in the second frame of the video an arrow flies to the sky; in the third frame of the video the goose falls from the sky; in the fourth frame of the video a dog picks up the goose; and in a fifth frame of the video the dog comes back to the man?

Audio Prompt—In addition to the video described, audio associated with the first frame includes low-toned breathing sounds and sounds of grass rustling and wind blowing; audio associated with the second frame of the video includes wind sounds; audio associated with the third frame of the video the includes a bird squawking sound followed by a thud sound effect; audio associated with the fourth frame of the video includes a dog panting sound effect; and audio associated with the fifth frame of the video includes a voice stating "Good boy!"

As described, an LLM of the content analysis module 132 may output the following Example Response to the Example Prompts. According to some aspects, Example Response is just an example and other responses may be output based on deep video understanding with large language models.

Example Response

LLM output—The video you've described appears to depict a form of hunting known as waterfowl hunting, where a goose is being hunted with the assistance of a dog. Here's a breakdown of what's happening:

First Frame: A goose is flying in the sky. On the ground, there is a man with a bow (not an archer) and a dog nearby. The man is likely preparing to shoot the goose.

Second Frame: An arrow is shot into the sky from the man's bow. The arrow is intended to hit the goose and bring it down.

Third Frame: The arrow presumably hits the goose, causing it to fall from the sky.

Fourth Frame: The dog retrieves the fallen goose. In many forms of waterfowl hunting, dogs are trained to retrieve the downed birds from the water or ground.

Fifth Frame: The dog returns to the man with the captured goose, completing the hunting process.

In summary, the video shows a man using a bow to hunt a goose in flight, and a trained dog helping retrieve the goose once it's been shot. This is a form of hunting that is done for sport or sustenance in some regions where waterfowl are abundant.

According to some aspects of this disclosure, additional prompts for an LLM of the content analysis module 132 may derived from metadata, closed captioning data, audio descriptive data, and/or the like associated with a content item. Any data associated with a content item may be used to generate prompts for an LLM of the content analysis module 132.

According to some aspects of this disclosure, rather than using a machine learning model to generate prompts (e.g., visual prompts, audio prompts, etc.) for an LLM of the content analysis module 132, a deep learning model (e.g., a predictive model, a convolutional neural network, etc.) of the content analysis module 132 may iterate through each frame of a content item, extract features indicative of visual elements/objects and their relationships to other visual elements/objects within the frames, and generate visual embeddings to that are provided directly to an embedding layer of an LLM. Similarly, audio embeddings generated from audio content associated with a content item may be provided directly to an embedding layer (and/or feed-forward layer) of an LLM. For example, visual features from video data and audio features from audio data associated with each frame of a content item may be transformed into a temporal sequence of embeddings. The temporal sequence of embeddings may correspond to a sequence of occurrence for each frame of the content item. As described herein the LLM may use the visual and audio embeddings to generate an output that describes what is happening in the content item.

Figure 3:
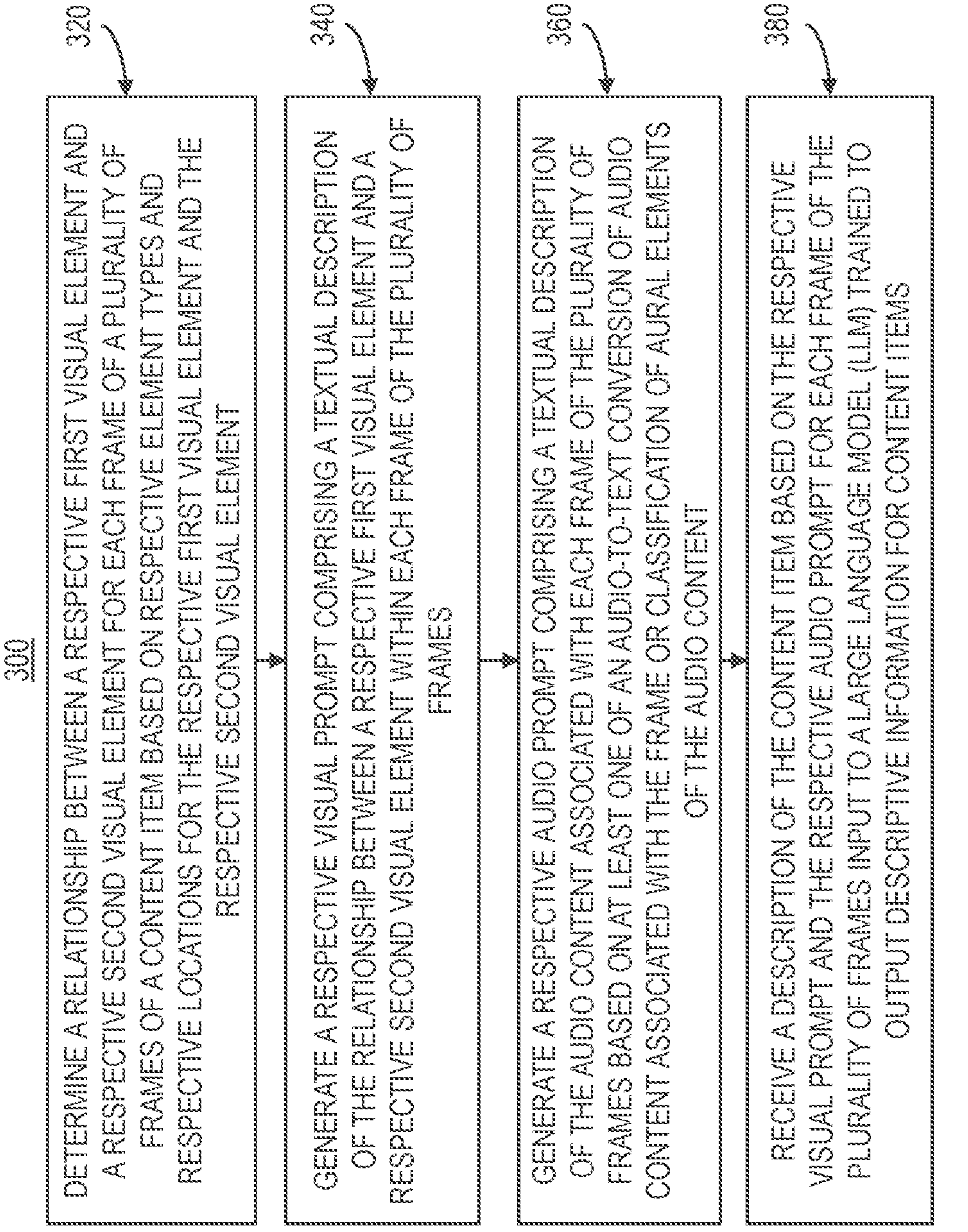
FIG. 3 illustrates a flowchart of an example method for deep video understanding with large language models, according to some embodiments.

FIG. 3 shows a flowchart of an example method 300 for deep video understanding with large language models, according to some aspects of this disclosure. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1-2. However, method 300 is not limited to the aspects of those figures. A computer-based system (e.g., the multimedia environment 102, the system server(s) 126, etc.) may facilitate deep video understanding with large language models.

In 320, system server(s) 126 (e.g., the content analysis module 132, etc.), for each frame of a plurality of frames of a content item, determines a relationship between a respective first visual element and a respective second visual element within the frame. For example, system server(s) 126 determines the relationship between the respective first visual element and the respective second visual element within the frame based on respective element types and respective locations for the respective first visual element and the respective second visual element.

System server(s) 126 determines the respective element types and the respective locations for the respective first visual element and the respective second visual element within each frame of the plurality of frames of the content item based on a predictive model trained for object detection and classification iterating through each frame of the plurality of frames of the content item. Determining the relationship between the respective first visual element and the respective second visual element for each frame of the plurality of frames of the content item may be based on spatial, temporal, or contextual rules applied to the respective element types and the respective locations for the respective first visual element and the respective second visual element within the frame.

In 340, system server(s) 126, for each frame of the plurality of frames of the content item, generates a respective visual prompt comprising a textual description of the relationship between the respective first visual element and the respective second visual element within the frame.

In 360, system server(s) 126, for each frame of the plurality of frames of the content item, generates a respective audio prompt comprising a textual description of the audio content associated with the frame. For example, system server(s) 126 generates the respective audio prompt based on an audio-to-text conversion of audio content associated with the frame, classification of aural elements of the audio content, and/or the like.

In 380, system server(s) 126 receives a description of the content item. For example, system server(s) 126 receives the description of the content item based on the respective visual prompt and the respective audio prompt for each frame of the plurality of frames input to a large language model (LLM) trained to output descriptive information for content items. According to some aspects of this disclosure, a sequence of the input of the respective visual prompt and the respective audio prompt for each frame of the plurality of frames to the LLM corresponds to a sequence of occurrence of each frame of the plurality of frames within the content item. According to some aspects of this disclosure, system server(s) 126 receives the description of the content item based on an additional prompt for each frame of the plurality of frames generated from at least one of metadata associated with the content item, closed captioning data associated with the content item, or audio descriptive data associated with the content item input to the LLM in addition to or instead of the respective visual prompts and/or respective audio prompts.

According to some aspects of this disclosure, method 300 may further include system server(s) 126 sending at least one of the content item or an indication of the content item to a user device based on at least a portion of a description for a type of content item received from the user device matching at least a portion of the description of the content item.

According to some aspects of this disclosure, method 300 may further include system server(s) 126, for each frame of a plurality of frames of another content item, extracting respective visual features. System server(s) 126 extracts respective audio features from audio content associated with each frame of the plurality of frames of the another content item. System server(s) 126 transforms the respective visual features and the respective audio features for each frame of the plurality of frames of the another content item into a temporal sequence of embeddings. For example, the temporal sequence of embeddings may correspond to a sequence of occurrence for each frame of the plurality of frames of the another content item. System server(s) 126 a description of the another content item based on the temporal sequence of embeddings input to an embedding layer and/or feedforward layer of the LLM.

Example Computer System

Figure 4:
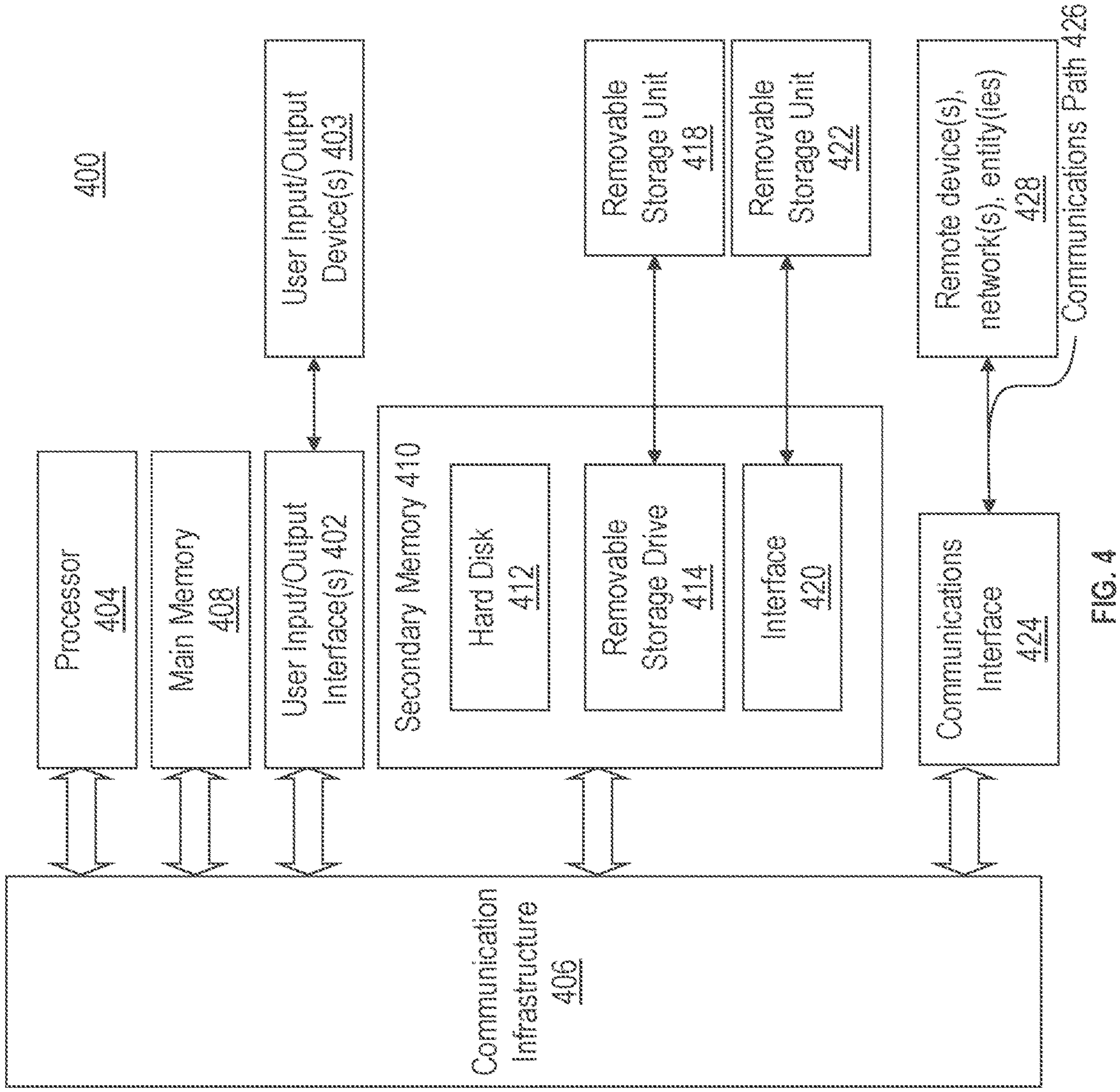
FIG. 4 illustrates an example computer system useful for implementing various embodiments.

Various embodiments may be implemented, for example, using one or more well-known computer systems, such as computer system 400 shown in FIG. 4. For example, the media device 106 and/or system server(s) 126 may be implemented using combinations or sub-combinations of computer system 400. Also or alternatively, one or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer-usable or readable storage device having stored thereon computer software (control logic) and/or data. Removable storage unit 418 may be a floppy disk, magnetic tape, compact disk, DVD, optical storage disk, and/or any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400 or processor(s) 404), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 4. In particular, embodiments can operate with software, hardware, and/or operating system implementations other than those described herein.

Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expressions "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:

for each frame of a plurality of frames of a content item:

determining, by at least one computer processor, based on (i) respective element types and respective locations for a respective first visual element and a respective second visual element within the frame and (ii) at least one of spatial rules, temporal rules, or contextual rules applied to the respective element types and the respective locations for the respective first visual element and the respective second visual element within the frame, a relationship between the respective first visual element and the respective second visual element, generating a respective visual prompt comprising a textual description of the relationship between the respective first visual element and the respective second visual element within the frame, and generating, based on at least one of an audio-to-text conversion of audio content associated with the frame or classification of aural elements of the audio content, a respective audio prompt comprising a textual description of the audio content associated with the frame; and receiving, based on (i) the respective visual prompt and the respective audio prompt for each frame of the plurality of frames and (ii) an additional prompt for each frame generated from at least one of metadata associated with the content item, closed captioning data associated with the content item, or audio descriptive data associated with the content item input to a large language model (LLM) trained to output descriptive information for content items, a description of the content item.

2. The computer-implemented method of claim 1, wherein the determining the relationship between the respective first visual element and the respective second visual element for each frame of the plurality of frames of the content item comprises extracting feature vectors representing attributes of the respective first visual element and the respective second visual element, the attributes including at least size, shape, color, and position within the frame, and determining the relationship based on the extracted feature vectors.

3. The computer-implemented method of claim 1, wherein a sequence of the input of the respective visual prompt and the respective audio prompt for each frame of the plurality of frames to the LLM corresponds to a sequence of occurrence of each frame of the plurality of frames within the content item.

4. The computer-implemented method of claim 1, further comprising sending at least one of the content item or an indication of the content item to a user device based on at least a portion of a description for a type of content item received from the user device matching at least a portion of the description of the content item.

5. The computer-implemented method of claim 1, wherein relationships between visual elements within the frame are represented using a graph in which nodes represent the visual elements and edges represent relationships between the visual elements, and wherein the determining the relationship between the respective first visual element and the respective second visual element comprises analyzing the graph using a graph neural network (GNN).

6. The computer-implemented method of claim 1 further comprising:

extracting, for each frame of a plurality of frames of another content item, respective visual features;

extracting, from audio content associated with each frame of the plurality of frames of the another content item, respective audio features;

transforming the respective visual features and the respective audio features for each frame of the plurality of frames of the another content item into a temporal sequence of embeddings, wherein the temporal sequence of embeddings corresponds to a sequence of occurrence for each frame of the plurality of frames of the another content item; and receiving, based on the temporal sequence of embeddings input to the LLM, a description of the another content item.

7. The computer-implemented method of claim 1, wherein generating the respective audio prompt further comprises extracting one or more key terms from the audio-to-text conversion and performing sentiment analysis on the audio-to-text conversion, and wherein the respective audio prompt includes the one or more key terms and an indication of a result of the sentiment analysis.

8. A system comprising:

one or more memories;

at least one processor each coupled to at least one of the memories and configured to perform operations comprising:

for each frame of a plurality of frames of a content item:

determining, based on (i) respective element types and respective locations for a respective first visual element and a respective second visual element within the frame and (ii) at least one of spatial rules, temporal rules, or contextual rules applied to the respective element types and the respective locations for the respective first visual element and the respective second visual element within the frame, a relationship between the respective first visual element and the respective second visual element, generating a respective visual prompt comprising a textual description of the relationship between the respective first visual element and the respective second visual element within the frame, and generating, based on at least one of an audio-to-text conversion of audio content associated with the frame or classification of aural elements of the audio content, a respective audio prompt comprising a textual description of the audio content associated with the frame; and receiving, based on (i) the respective visual prompt and the respective audio prompt for each frame of the plurality of frames and (ii) an additional prompt for each frame generated from at least one of metadata associated with the content item, closed captioning data associated with the content item, or audio descriptive data associated with the content item input to a large language model (LLM) trained to output descriptive information for content items, a description of the content item.

9. The system of claim 8, wherein the determining the relationship between the respective first visual element and the respective second visual element for each frame of the plurality of frames of the content item comprises extracting feature vectors representing attributes of the respective first visual element and the respective second visual element, the attributes including at least size, shape, color, and position within the frame, and determining the relationship based on the extracted feature vectors.

10. The system of claim 8, wherein a sequence of the input of the respective visual prompt and the respective audio prompt for each frame of the plurality of frames to the LLM corresponds to a sequence of occurrence of each frame of the plurality of frames within the content item.

11. The system of claim 8, the operations further comprising sending at least one of the content item or an indication of the content item to a user device based on at least a portion of a description for a type of content item received from the user device matching at least a portion of the description of the content item.

12. The system of claim 8, wherein relationships between visual elements within the frame are represented using a graph in which nodes represent the visual elements and edges represent relationships between the visual elements, and wherein the determining the relationship between the respective first visual element and the respective second visual element comprises analyzing the graph using a graph neural network (GNN).

13. The system of claim 8, the operations further comprising:

extracting, for each frame of a plurality of frames of another content item, respective visual features;

extracting, from audio content associated with each frame of the plurality of frames of the another content item, respective audio features;

transforming the respective visual features and the respective audio features for each frame of the plurality of frames of the another content item into a temporal sequence of embeddings, wherein the temporal sequence of embeddings corresponds to a sequence of occurrence for each frame of the plurality of frames of the another content item; and receiving, based on the temporal sequence of embeddings input to the LLM, a description of the another content item.

14. The system of claim 8, wherein generating the respective audio prompt further comprises extracting one or more key terms from the audio-to-text conversion and performing sentiment analysis on the audio-to-text conversion, and wherein the respective audio prompt includes the one or more key terms and an indication of a result of the sentiment analysis.

15. A non-transitory computer-readable medium having instructions stored thereon that, when executed by at least one computing device, cause the at least one computing device to perform operations comprising:

for each frame of a plurality of frames of a content item:

determining based on (i) respective element types and respective locations for a respective first visual element and a respective second visual element within the frame and (ii) at least one of spatial rules, temporal rules, or contextual rules applied to the respective element types and the respective locations for the respective first visual element and the respective second visual element within the frame, a relationship between the respective first visual element and the respective second visual element, generating a respective visual prompt comprising a textual description of the relationship between the respective first visual element and the respective second visual element within the frame, and generating, based on at least one of an audio-to-text conversion of audio content associated with the frame or classification of aural elements of the audio content, a respective audio prompt comprising a textual description of the audio content associated with the frame; and receiving, based on (i) the respective visual prompt and the respective audio prompt for each frame of the plurality of frames and (ii) an additional prompt for each frame generated from at least one of metadata associated with the content item, closed captioning data associated with the content item, or audio descriptive data associated with the content item input to a large language model (LLM) trained to output descriptive information for content items, a description of the content item.

16. The non-transitory computer-readable medium of claim 15, wherein the determining the relationship between the respective first visual element and the respective second visual element for each frame of the plurality of frames of the content item comprises extracting feature vectors representing attributes of the respective first visual element and the respective second visual element, the attributes including at least size, shape, color, and position within the frame, and determining the relationship based on the extracted feature vectors.

17. The non-transitory computer-readable medium of claim 15, wherein a sequence of the input of the respective visual prompt and the respective audio prompt for each frame of the plurality of frames to the LLM corresponds to a sequence of occurrence of each frame of the plurality of frames within the content item.

18. The non-transitory computer-readable medium of claim 15, the operations further comprising sending at least one of the content item or an indication of the content item to a user device based on at least a portion of a description for a type of content item received from the user device matching at least a portion of the description of the content item.

19. The non-transitory computer-readable medium of claim 15, wherein relationships between visual elements within the frame are represented using a graph in which nodes represent the visual elements and edges represent relationships between the visual elements, and wherein the determining the relationship between the respective first visual element and the respective second visual element comprises analyzing the graph using a graph neural network (GNN).

20. The non-transitory computer-readable medium of claim 15, the operations further comprising:

extracting, for each frame of a plurality of frames of another content item, respective visual features;

extracting, from audio content associated with each frame of the plurality of frames of the another content item, respective audio features;

transforming the respective visual features and the respective audio features for each frame of the plurality of frames of the another content item into a temporal sequence of embeddings, wherein the temporal sequence of embeddings corresponds to a sequence of occurrence for each frame of the plurality of frames of the another content item; and receiving, based on the temporal sequence of embeddings input to the LLM, a description of the another content item.

* * * * *